(12) United States Patent
Wang et al.

(10) Patent No.: US 12,023,977 B2
(45) Date of Patent: Jul. 2, 2024

(54) SEMI-ACTIVE ANTI-YAW DAMPER, DAMPING SYSTEM AND VEHICLE

(71) Applicant: CRRC QINGDAO SIFANG CO., LTD., Shandong (CN)

(72) Inventors: Xu Wang, Shandong (CN); Haipeng Kong, Shandong (CN); Hongyong Cao, Shandong (CN); Pingyu Zhou, Shandong (CN); Xiaowen Song, Shandong (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 367 days.

(21) Appl. No.: 17/605,183

(22) PCT Filed: May 18, 2020

(86) PCT No.: PCT/CN2020/090836
§ 371 (c)(1),
(2) Date: Oct. 20, 2021

(87) PCT Pub. No.: WO2020/253443
PCT Pub. Date: Dec. 24, 2020

(65) Prior Publication Data
US 2022/0185054 A1   Jun. 16, 2022

(30) Foreign Application Priority Data
Jun. 20, 2019 (CN) .......................... 201910536480.6

(51) Int. Cl.
*F16F 9/512*   (2006.01)
*B60G 17/015*  (2006.01)
*B60G 17/019*  (2006.01)

(52) U.S. Cl.
CPC ... *B60G 17/01908* (2013.01); *B60G 17/0152* (2013.01); *B60G 2206/41* (2013.01);
(Continued)

(58) Field of Classification Search
CPC .......... B60G 17/01908; B60G 17/0152; B60G 2206/41; B60G 2300/10; B60G 2400/10;
(Continued)

(56) References Cited
U.S. PATENT DOCUMENTS

| | | | | | |
|---|---|---|---|---|---|
| 4,999,777 A | * | 3/1991 | Schussler | ............. | B60G 17/016 280/5.506 |
| 5,775,470 A | * | 7/1998 | Feigel | .................... | B60G 17/08 188/266.6 |

(Continued)

FOREIGN PATENT DOCUMENTS

| CN | 1699781 A | 11/2005 |
|---|---|---|
| CN | 101194108 A | 6/2008 |

(Continued)

OTHER PUBLICATIONS

The State Intellectual Property Office of People's Republic of China, First Office Action issued in corresponding Application No. 201910536480.6 mailed Aug. 26, 2020.
(Continued)

*Primary Examiner* — Christopher P Schwartz
(74) *Attorney, Agent, or Firm* — Stites & Harbison, PLLC; Jeffrey A. Haeberlin (57) ABSTRACT

A semi-active anti-yaw damper (100), a damping system and a vehicle are provided. When a piston (2) of the semi-active anti-yaw damper (100) reciprocates in the hydraulic cylinder (1), an interior of the hydraulic cylinder (1) is divided into two cylinder blocks (PA, PB). The semi-active anti-yaw damper (100) includes at least two parallel branches (B1, B2), the two ends of each of the parallel branches (B1, B2) are connected to the two cylinder blocks (PA, PB), respectively, and each of the parallel branches (B1, B2) is provided with an adjustable solenoid valve (PV), and the adjustable solenoid valve (PV) is configured to adjust a damping coefficient of the semi-active anti-yaw damper (100) when
(Continued)

the semi-active anti-yaw damper (100) is in a semi-active mode.

19 Claims, 4 Drawing Sheets

(52) U.S. Cl.
CPC ...... *B60G 2300/10* (2013.01); *B60G 2400/10* (2013.01); *B60G 2400/5182* (2013.01); *B60G 2500/114* (2013.01); *B60G 2600/182* (2013.01); *B60G 2800/016* (2013.01)

(58) Field of Classification Search
CPC ...... B60G 2400/5182; B60G 2500/114; B60G 2600/182; B60G 2800/016
USPC ......... 188/266.5, 266.6, 282.2, 282.4, 282.6, 188/286, 322.13, 322.15; 280/5.515, 280/5.519, 275, 276
See application file for complete search history.

(56) References Cited

U.S. PATENT DOCUMENTS

| | | | |
|---|---|---|---|
| 6,755,113 | B2 | 6/2004 | Shih |
| 7,699,147 | B2 * | 4/2010 | Preukschat ............ B60G 17/04 188/282.4 |
| 8,839,920 | B2 * | 9/2014 | Anderson ............. B60G 13/14 180/165 |
| 10,421,330 | B2 * | 9/2019 | Jeong ................... B60G 17/019 |
| 11,084,350 | B2 * | 8/2021 | Birch .................... B60G 15/06 |
| 11,339,846 | B2 * | 5/2022 | Suzuki ............... B60G 17/0565 |
| 2002/0074197 | A1 | 6/2002 | Preukschat et al. |
| 2008/0276611 | A1 | 11/2008 | Gaile et al. |
| 2010/0155186 | A1 | 6/2010 | Preukschat et al. |
| 2013/0345933 | A1 * | 12/2013 | Norton .................. B60G 17/08 701/37 |
| 2014/0216871 | A1 * | 8/2014 | Shibahara ............... F16F 9/348 188/313 |
| 2016/0230830 | A1 * | 8/2016 | Haller .................... B60G 13/00 |
| 2019/0084367 | A1 | 3/2019 | Birch et al. |
| 2022/0154796 | A1 * | 5/2022 | Wang ..................... B61F 5/245 |

FOREIGN PATENT DOCUMENTS

| | | |
|---|---|---|
| CN | 102069813 A | 5/2011 |
| CN | 102537176 A | 7/2012 |
| CN | 102808886 A | 12/2012 |
| CN | 102537176 B | 7/2014 |
| CN | 104389753 A | 3/2015 |
| CN | 110360263 A | 10/2019 |
| DE | 102009041110 A1 | 3/2011 |
| DE | 102017106802 A1 | 10/2018 |
| EP | 3216633 A1 | 9/2017 |
| EP | 3357723 A1 | 8/2018 |
| JP | H08-239040 A | 9/1996 |
| JP | H08-270257 A | 10/1996 |
| JP | 2000264034 A | 9/2000 |
| JP | 2014-198522 A | 10/2014 |
| JP | 2016-88358 A | 5/2016 |
| JP | 2018-35829 A | 3/2018 |
| RU | 2669909 C1 | 10/2018 |
| WO | 2018/177976 A1 | 10/2018 |
| WO | 2018/222821 A1 | 12/2018 |

OTHER PUBLICATIONS

China National Intellectual Property Administration, International Search Report issued in corresponding Application No. PCT/CN2020/090836, mailed Aug. 13, 2020.
The State Intellectual Property Office of People's Republic of China, Second Office Action Issued in corresponding Application No. 201910536480.6 mailed Feb. 19, 2021.
China National Intellectual Property Administration, Search Report issued in corresponding Application No. 201910536480.6 mailed Aug. 18, 2020.
European Patent Office, Search Report issued in corresponding Application No. EP 20827928.1, dated Jul. 29, 2022.
Japan Patent Office, First Office Action issued in corresponding Application No. JP 2021-568075, dated Dec. 23, 2020 (English translation not available).
Federal Service for Intellectual Property (Russia), First Office Action issued in corresponding Application No. RU 2022100114/11, dated Jun. 29, 2022 (English translation not available).

* cited by examiner

SEMI-ACTIVE ANTI-YAW DAMPER, DAMPING SYSTEM AND VEHICLE

CROSS-REFERENCE TO RELATED APPLICATION

The present application claims priority to Chinese Application No. 2019105364806, filed on Jun. 20, 2019, entitled "Semi-active Anti-yaw damper, Damping system, and Vehicle", which is hereby incorporated by reference in its entirety.

FIELD OF TECHNOLOGY

The present application relates to the technical field of dampers, and in particular to a semi-active anti-yaw damper, a damping system, and a vehicle.

BACKGROUND

An anti-yaw damper is an important part of a suspension system and has a main function of generating a damping force against revolution between a bogie frame and a vehicle body, consuming the vibration energy therebetween, thereby suppressing hunting vibration.

The anti-yaw damper is a key component that affects the stability of the train. When the train runs in different conditions, it has different requirements for parameters of the damper. According to the damping principle, the traditional anti-yaw damper is a passive anti-yaw damper. Therefore, it is impossible for the traditional passive damper to keep the suspension system of the train always being in a best matching state according to the running requirements for the train since performance parameters of the passive damper cannot be adjusted in real time due to a fixed characteristic curve.

Moreover, as there are more and more trains running across lines, countries and regions, the demand for the parameters of the damper becomes more and more diversified, and it is difficult for the traditional passive damper to be compatible with the needs of different lines due to the fixed and non-adjustable performance parameters.

In addition, during the entire repair cycle of a vehicle system, requirements for the parameters of anti-yaw damper are not the same. Since a taper of a new wheel is smaller, the anti-yaw damper is required to mainly exhibit stiffness characteristics; while the taper of the wheel becomes larger as the running mileage increases, and anti-yaw dampers are required to exhibit damping characteristics. Moreover, it is difficult for the traditional passive damper to achieve the purpose of extending the repair period and reducing operating costs since it has fixed and non-adjustable performance parameters.

BRIEF SUMMARY

(1) Technical Problems to be Solved

An embodiment of the present application provides a semi-active anti-yaw damper, a damping system and a vehicle so as to solve various defects due to inability to adjust the performance parameters of the traditional anti-yaw dampers in the prior art.

(2) Technical Solutions

In order to solve the above technical problems, the present application provides a semi-active anti-yaw damper, including a hydraulic cylinder and a piston. When the piston reciprocates in the hydraulic cylinder, an interior of the hydraulic cylinder is divided into two cylinder blocks. The semi-active anti-yaw damper further includes at least two parallel branches, each branch of the at least two parallel branches has two ends respectively connected to the two cylinder blocks and is provided with an adjustable solenoid valve, and the adjustable solenoid valve is configured to adjust a damping coefficient of the semi-active anti-yaw damper when the semi-active anti-yaw damper is in a semi-active mode.

In some embodiments, each branch of the at least two parallel branches includes a one-way throttle valve and the adjustable solenoid valve connected in series.

In some embodiments, each branch of the at least two parallel branches includes a first branch and a second branch, an end of the first branch and an end of the second branch are connected in parallel at a first node, and another end of the first branch and another end of the second branch are connected in parallel at a second node, and the first node and the second node are communicated with the two cylinder blocks of the hydraulic cylinder, respectively; and the first branch has an opposite flow direction to the second branch.

In some embodiments, the first node and the second node respectively communicate with the two cylinder blocks of the hydraulic cylinder through respective main oil lines, at least one relief branch is communicated between two main oil lines and all relief branches are connected to each other in parallel.

In some embodiments, each of the at least one relief branches is connected in series with a relief valve.

In some embodiments, the damper further includes an oil reservoir communicated with the two main oil lines through oil reservoir lines, respectively, and each of the oil reservoir lines is connected in series with a throttle valve.

In some embodiments, a relief oil line is communicated between each main oil line and the oil reservoir, the relief oil line is connected in parallel with each of the oil reservoir lines, and the relief oil line is provided with a relief valve connected in series.

In some embodiments, the damper further includes an emergency oil line having two ends communicated with the two cylinder blocks, respectively, the emergency oil line is provided with a non-adjustable solenoid switch valve, and the non-adjustable solenoid switch valve is configured to enable the emergency oil line when the damper is in a passive mode.

In some embodiments, the emergency oil line includes a damping hole and the solenoid switch valve connected to each other in series.

The present application further provides a damping system, including a controller and at least one semi-active anti-yaw damper as described above, the at least one semi-active anti-yaw damper is mounted on a bogie, and a signal input end and a signal output end of the controller are respectively connected with each of the at least one semi-active anti-yaw damper.

In some embodiments, the damping system further includes a data acquisition mechanism mounted on the semi-active anti-yaw damper and connected with the signal input end of the controller, the data acquisition mechanism is configured to transmit real-time running parameters of the semi-active anti-yaw damper to the controller such that a damping force required for the damper is calculated by the controller according to the real-time running parameters, and a control signal involving the damping force is fed back to the semi-active anti-yaw damper.

In some embodiments, the data acquisition mechanism includes a pressure sensor and a displacement sensor, each of the two cylinder blocks of the hydraulic cylinder is provided with the pressure sensor therein, the displacement sensor is provided on the piston, and the pressure sensor and the displacement sensor are connected to the signal input end of the controller, respectively.

In some embodiments, the data acquisition mechanism includes an acceleration sensor connected to the signal input end of the controller.

In some embodiments, the controller is provided with an external interface connected with a cut-off relay.

The present application further provides a vehicle including the above-mentioned damping system.

Beneficial Effects

Through the technical solution above of the present application, the following beneficial effects are achieved:

In one aspect, according to the present application, when the piston of the semi-active anti-yaw damper reciprocates in the hydraulic cylinder, an interior of the hydraulic cylinder is divided into two cylinder blocks. The damper includes at least two parallel branches, the two ends of each of the parallel branches are connected to the two cylinder blocks, respectively, and each of the parallel branches is provided with an adjustable solenoid valve, and the adjustable solenoid valve is configured to adjust a damping coefficient of the damper when the damper is in a semi-active mode. According to the present application, the semi-active anti-yaw damper is in the semi-active mode during normal operation, and in this case, the damper changes the branch through which the oil flows based on the oil pressure difference between the two cylinder blocks in the hydraulic cylinder, and uses the adjustable solenoid valve on the corresponding branch to adjust the damping force of oil such that the damper can has a controllable damping force and damping coefficient in the semi-active mode, thereby solving above-mentioned defects due to the inability to adjust the performance parameters of the traditional anti-yaw dampers in the prior art.

On the other hand, the damping system according to the present application includes a controller and at least one above-mentioned semi-active anti-yaw damper installed on the bogie, and the signal input end and the signal output end of the controller are connected to each damper, respectively. Currently required performance parameters of the damper are calculated according to the actual operation state of the vehicle using the controller, the controller then transmits control signals with the current performance parameters to the damper, so as to ensure that the damper may adjust various performance parameters in real time according to the operation requirements of the vehicle to keep a suspension system of the train being in the best matching state, and may be compatible with different geographic environments, operation demands of vehicles required by different line, and the repair cycle of vehicles may be effectively extended, the service life of the vehicle is prolonged and the operating costs are decreased.

BRIEF DESCRIPTION OF THE DRAWINGS

In order to more clearly illustrate the technical solutions disclosed in the embodiments of the present application or the prior art, the drawings used in the descriptions of the embodiments or the prior art will be briefly described below. It should be noted that, the drawings in the following description are only illustrative embodiments of the present application, and other drawings can be obtained according to these drawings without any creative work for those skilled in the art.

100, semi-active anti-yaw damper
1, hydraulic cylinder; 2, piston; 3, controller; 4, cut-off relay;
PA, first cylinder block; PB, second cylinder block; PV, adjustable solenoid valve;
C1, first interface; C2, second interface; C3, third interface;
B1, first branch; PV1, first adjustable solenoid valve; CV1, first one-way throttle valve;
B2, second branch; PV2, second adjustable solenoid valve; CV2, second one-way throttle valve;
B3, emergency oil line; SV, solenoid switch valve; TV1, limit orifice;
N1, first node; N2, second node;
CV3, third throttle valve; CV4, fourth throttle valve;
PRV1, first relief valve; PRV2, second relief valve; PRV3, third relief valve;
PP1, displacement sensor; P11, first pressure sensor; P12, second pressure sensor;
FP10, oil inlet; BP10, oil outlet; RP1, oil reservoir port; PRB1, PRB2, relief branch; ROL1, ROL2 oil reservoir line; PROL1, relief oil line.

DETAILED DESCRIPTION

The specific embodiments of the present application are further described in detail below in conjunction with the drawings and embodiments. The following embodiments are intended to illustrate the present application, but are not intended to limit the scope of the present application.

In the following description, the orientation or positional relationships indicated by terms such as "upper", "lower", "left", "right", "inside", "outside", "front", "rear", "head", "tail", etc. are based on the orientation or positional relationship shown in the drawings, and are merely for the convenience of describing the present application and simplifying the description, rather than indicating or implying that the device or component stated must have a particular orientation, is constructed and operated in a particular orientation, and thus is not to be construed as limiting the present application. Moreover, the terms "first", "second", "third", and the like are used for descriptive purposes only and are not to be construed as indicating or implying relative importance.

Figure 1:
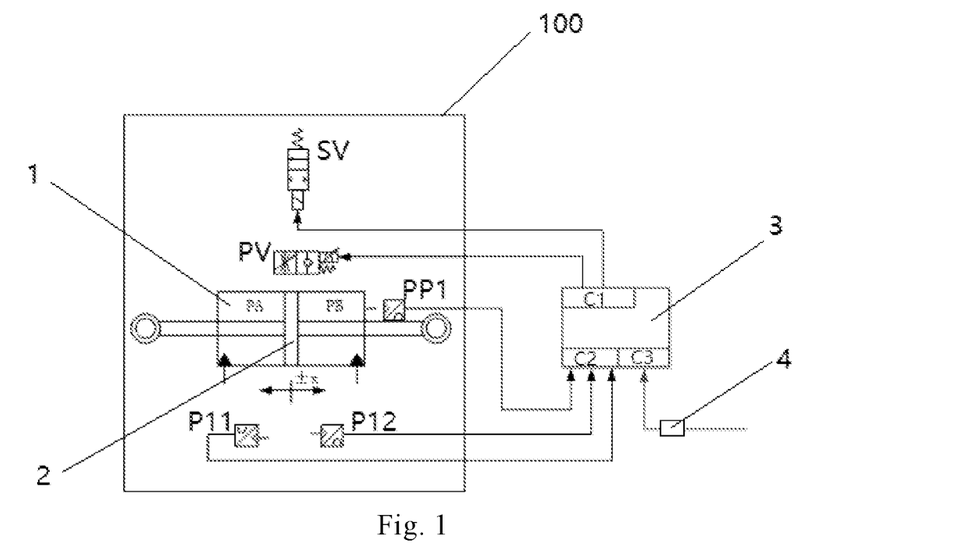
FIG. 1 is a control schematic structural diagram of a damping system according to an embodiment of the present application.
Figure 7:
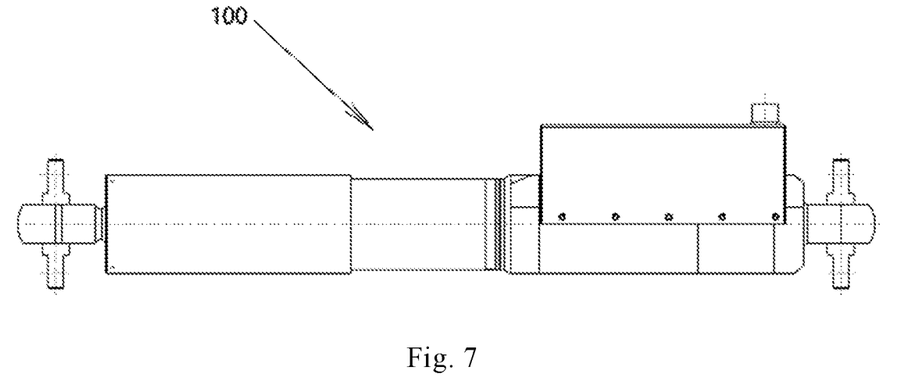
FIG. 7 is a front view of a semi-active anti-yaw damper according to an embodiment of the present application.
Figure 8:
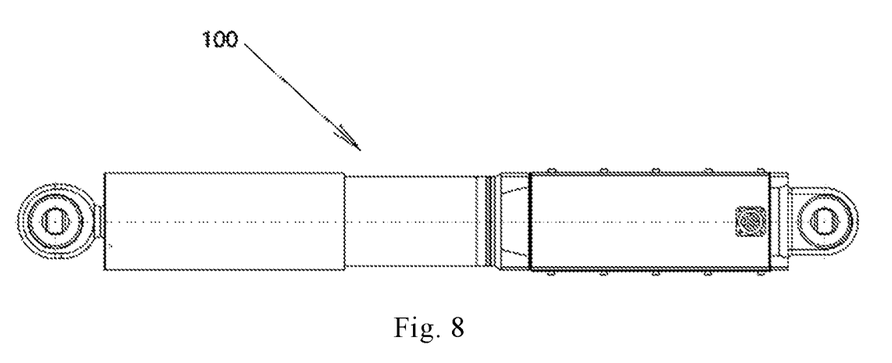
FIG. 8 is a top view of a semi-active anti-yaw damper according to an embodiment of the present application.
Figure 9:
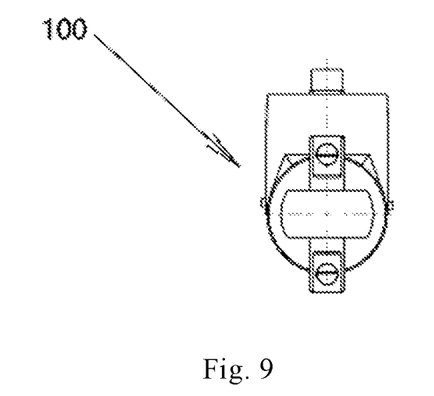
FIG. 9 is a side view of a semi-active anti-yaw damper according to an embodiment of the present application.

The present embodiment provides a semi-active anti-yaw damper 100, a damping system, and a vehicle. A main structure of the semi-active anti-yaw damper 100 is shown in FIGS. 7-9, and an oil line control structure of the damper is shown in FIGS. 2-6. The damping system includes the semi-active anti-yaw damper 100, and a control structure of the damping system is shown in FIG. 1. The vehicle includes the damping system.

As shown in FIG. 1, when a piston 2 of the semi-active anti-yaw damper 100 according to the embodiment reciprocates in a hydraulic cylinder 1, the interior of the hydraulic cylinder 1 is divided into two cylinder blocks. The hydraulic cylinder 1 shown in FIG. 1 is in a horizontally arranged state. As shown in FIG. 1, the piston 2 reciprocates leftwards and rightwards inside the hydraulic cylinder 1. A cylinder block on the left side of the piston 2 shown in FIG. 1 is a first cylinder block PA and the cylinder block on the right side of the piston 2 is a second cylinder block PB.

The damper in the present embodiment includes at least two parallel branches. Both ends of each branch communicate with the two main oil lines, respectively. Each branch is equipped with an adjustable solenoid valve PV configured to adjust the damping force of the oil passing through the branch when the damper is in the semi-active mode, thereby adjusting the damping coefficient of the damper, and then further adjusting various performance parameters of the damper in normal operation in real time so as to semi-actively control the damper.

The semi-active anti-yaw damper 100 is in the semi-active mode as being in normal operation. In this case, the piston 2 reciprocates inside the hydraulic cylinder 1, so that an oil pressure difference is generated between the two cylinder blocks in the hydraulic cylinder 1. The oil flows and switches between various branches according to the change of the oil pressure difference. The damper uses the adjustable solenoid valve on the corresponding branch through which oil flows to adjust the damping force of oil such that the damper has a controllable damping force and damping coefficient in the semi-active mode, thereby solving above defects due to the inability to adjust the performance parameters of the traditional anti-yaw dampers in the prior art.

Figure 2:
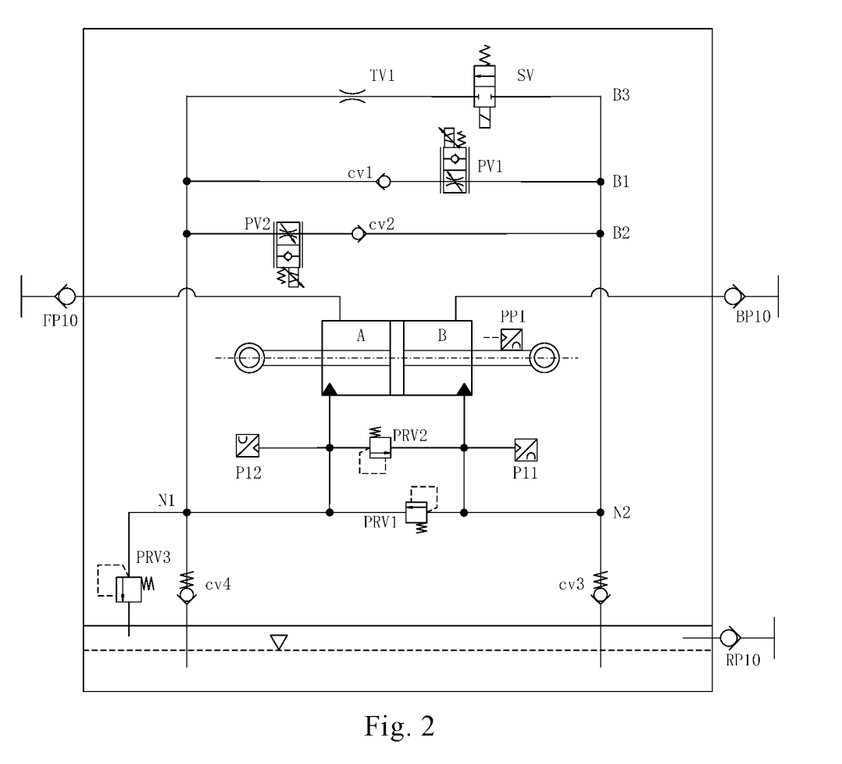
FIG. 2 is a schematic structural diagram showing oil lines of a semi-active anti-yaw damper according to an embodiment of the present application.

In order to facilitate oil line control, as shown in FIG. 2, two parallel branches are provided on the damper. An inlet of one branch communicates with the first cylinder PA, and the outlet of one branch communicates with the second cylinder PB; an inlet of the other branch communicates with the second cylinder PB, and an outlet of the other branch communicates with the first cylinder PA. In other words, oil in the two parallel branches flows in opposite directions.

In order to reasonably control the flow direction of each branch, each branch described in the present embodiment respectively includes one-way throttle valves and an adjustable solenoid valve PV connected in series. According to the preset flow direction of each branch, the one-way throttle valves and the adjustable solenoid valve PV are connected in series on the same branch so that oil flowing in the reverse direction may be blocked in time and the flow direction of oil inside the branch is limited reasonably. Preferably, the adjustable solenoid valve PV is solenoid proportional valves, so that the damping force of the oil flowing through the branch may be adjusted more accurately.

It is understandable that three or more parallel branches may be provided in the damper, as long as all the branches are connected in parallel, all the branches are divided into two groups and oil in the two groups of branches has an opposite flow direction such that semi-actively controlling for the damper can be achieved.

According to the present embodiment, the cylinder blocks on the left and right sides of the piston 2 have a same volume, and when the piston 2 reciprocates in the hydraulic cylinder 1, oil line through which oil in two groups of branches flows is the same such that the stability of the damping system can be ensured during adjustment of the damping force of the damper. Preferably, the hydraulic cylinder 1 is respectively connected with an oil inlet FP10 and an oil outlet BP10, so that oil can be delivered and supplied to the inside of the damper from the outside through the oil inlet FP10, and excess oil can be guided out of the damper through the oil outlet BP10 ensure the balance of the oil system inside the damper.

In the present embodiment, as shown in FIG. 2, the branch includes a first branch B1 and a second branch B2. One end of the first branch B1 and one end of the second branch B2 are connected in parallel to a first node N1 and the other end of the first branch B1 and the other end of the second branch B2 are connected in parallel with the second node N2, and the first node N1 and the second node N2 are connected with the two cylinder blocks of the hydraulic cylinder 1, respectively.

In the present embodiment, the first branch B1 has an opposite flow direction to the second branch B2. Specifically, the first branch B1 includes a first one-way throttle valve CV1 and a first adjustable solenoid valve PV1 connected in series. Base on the controlling of the first one-way throttle valve CV1, the oil in the first branch B1 may have a flow direction as follows: after flowing out of the first cylinder PA, oil flows through the first branch B1 and then flows back into the second cylinder PB. The second branch B2 includes a second one-way throttle valve CV2 and a second adjustable solenoid valve PV2. Based on the controlling of the second one-way throttle valve CV2, the oil in the second branch B2 can have a flow direction as follows: after flowing out of the second cylinder PB, oil flows through the second branch B2 and then flows back into the first cylinder PA.

Figure 3:
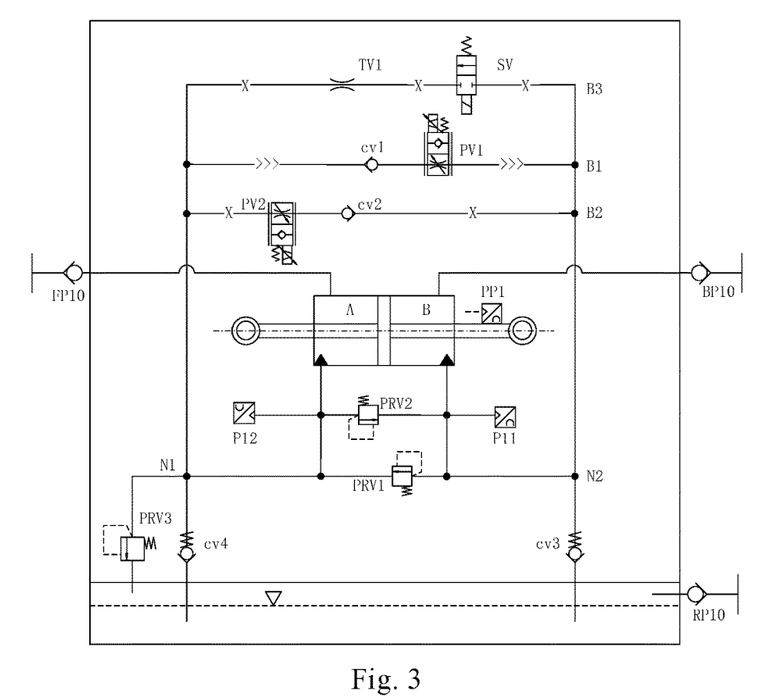
FIG. 3 is a first schematic diagram showing a state of a branch of a semi-active anti-yaw damper in a semi-active mode according to an embodiment of the present application.

When the damper is in the semi-active mode, as shown in FIG. 3, when the oil pressure inside the first cylinder PA of the hydraulic cylinder 1 is greater than that inside the second cylinder PB, after flowing out of the first cylinder PA, oil flows through the first node N1 and then enters the first branch B1. The oil out of the first branch B1 flows through the second node N2 and then flows back to the second cylinder PB, so that an oil control circuit is formed between the first branch B1 and the hydraulic cylinder 1. The second throttle valve in the second branch B2 has the oil kept between the first node N1 and the second throttle valve, so that the oil fails to flow through the second branch B2 to form a control circuit. In this case, the first adjustable solenoid valve PV1 may accurately adjust the damping force of the oil in the first branch B1, i.e., may adjust the system damping coefficient of the damper, so as to adjust performance parameters of the damper in real time and reliably.

Figure 4:
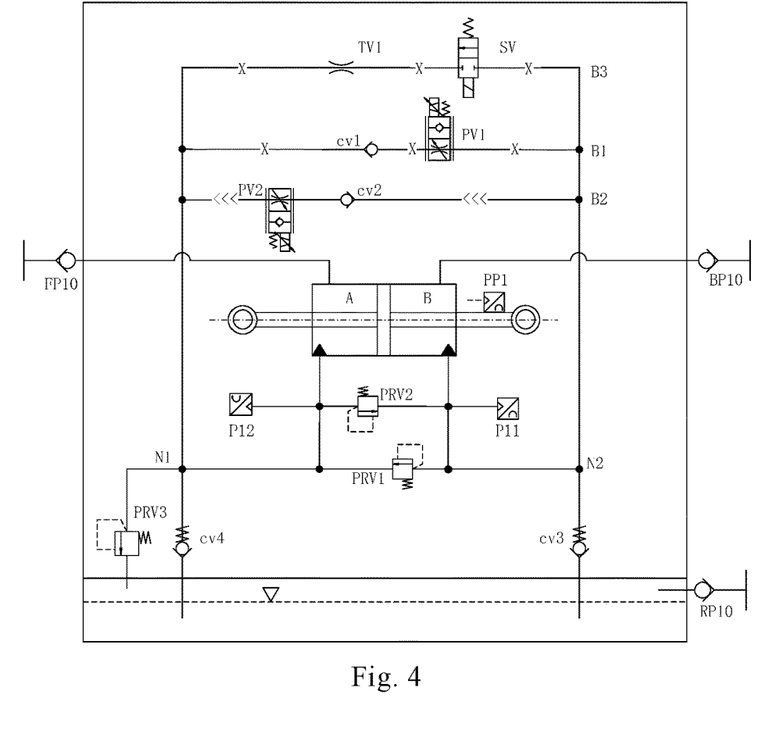
FIG. 4 is a second schematic diagram showing a state of a branch of a semi-active anti-yaw damper in a semi-active mode according to an embodiment of the present application.

Similarly, as shown in FIG. 4, when the damper is in the semi-active mode, as the oil pressure inside the second cylinder PB of the hydraulic cylinder 1 is greater than that inside the first cylinder PA, after flowing out of the second cylinder PB, oil flows through the second node N2 and then enters the second branch B2, and the oil out of the second branch B2 flows through the first node N1 and then flows back to the first cylinder PA, so that another oil control circuit is formed between the second branch B2 and the hydraulic cylinder 1. The first throttle valve in the first branch B1 has the oil kept between the second node N2 and the first throttle valve, so that the oil fails to flow through the first branch B1 to form a control circuit. In this case, the second adjustable solenoid valve PV2 may accurately adjust the damping force of the oil in the second branch B2, i.e., may adjust the system damping coefficient of the damper, so as to adjust performance parameters of the damper in real time and reliably.

Figure 5:
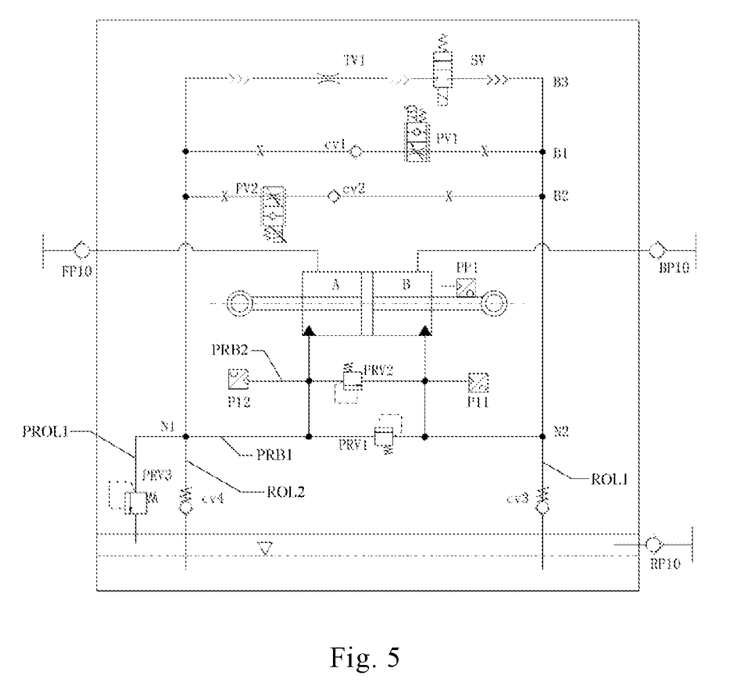
FIG. 5 is a schematic diagram showing a state of a branch of a semi-active anti-yaw damper in a passive mode according to an embodiment of the present application.

In order to ensure that the damper can operate normally in the event of a fault or power off, the damper of the present embodiment further includes an emergency oil line B3. Both ends of the emergency oil line B3 are connected to the two main oil lines, respectively. As shown in FIG. 5, preferably one end of the emergency oil line B3 is connected to the first node N1, and the other end of the emergency oil line B3 is connected to the second node N2, so as to ensure that the emergency oil line B3 is connected in parallel with all other branches. In order to ensure that the emergency oil line B3 may normally provide an oil closed-loop circuit for the hydraulic cylinder 1 in a power off state, the emergency oil line B3 is provided with a non-adjustable solenoid switch valve SV. The non-adjustable solenoid switch valve SV is configured to enable the emergency oil line B3 when the damper is in a passive mode so that the damper may use the emergency oil line B3 in the event of a fault or power off, thereby being switched to the passive mode.

In the present embodiment, as shown in FIG. 5, the emergency oil line B3 includes a damping hole TV1 and a solenoid switch valve SV connected in series. In the passive mode, the remaining branches except emergency oil line B3 are interrupted due to power off of the one-way throttle valve and adjustable solenoid valve PV on each branch, which blocks the flowing of oil along the corresponding branch. While the solenoid switch valve SV in the emergency oil line B3 may be turned on manually, or automatically turn into the turn-on state after power off, so as to ensure that the oil flowing out of the hydraulic cylinder 1 may flow through the emergency oil line B3 and then flow back into the hydraulic cylinder 1 so that an oil emergency control circuit is ensured to be formed between the emergency oil line B3 and the hydraulic cylinder 1.

In the present embodiment, the damping hole TV1 of the emergency oil line B3 is a non-adjustable limit orifice, and the solenoid switch valve SV fails to adjust a flow rate and a damping force of oil inside the emergency oil line B3. Therefore, when oil flows through the emergency oil line B3, all other branches are blocked and the damper is in the passive mode.

It is understandable that the damper of the present embodiment also has a small damping mode in addition to the above-mentioned semi-active mode and passive mode.

When the damper is in the semi-active mode, the solenoid switch valve SV of the emergency oil line B3 is in a charged normally closed state, and the adjustable solenoid valves PV of each branch are in a charged state. In this case, the system damping force of the damper is generated by the hydraulic oil flowing through the adjustable solenoid valve PV, and the magnitude of the damping coefficient is determined by a control voltage of corresponding adjustable solenoid valve PV. In order to stably control the oil line, the first adjustable solenoid valve PV1 in the first branch B1 has equal control voltage to the second adjustable solenoid valve PV2 in the second branch B2.

When the damper is in the passive mode, the damper is in a fault or power-off state, and the adjustable solenoid valve PV and one-way throttle valve of each branch stop working, so that the circulation state of each branch is completely blocked, and the oil is in a non-circulation state in the branch. In this case, the non-adjustable solenoid switch valve SV of the emergency oil line B3 is activated, so that the oil flows through the emergency oil line B3 to form a control circuit. The damping force of the damper is generated by the hydraulic oil flowing through the non-adjustable damping hole TV1.

Figure 6:
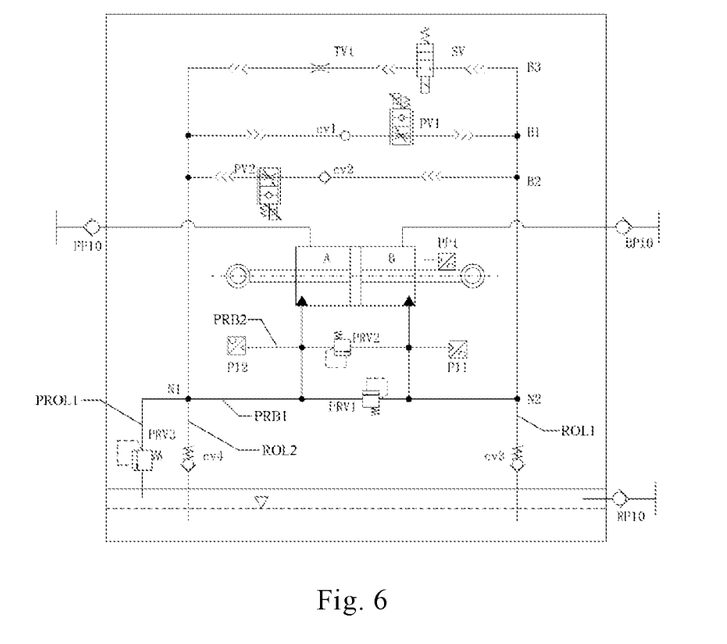
FIG. 6 is a schematic diagram showing a state of a branch of a semi-active anti-yaw damper in a small-damping mode according to an embodiment of the present application.

When the damper is in the small damping mode, as shown in FIG. 6, the solenoid switch valve SV of the emergency oil line B3 is turned on, and the adjustable solenoid valves PV of all branches are turned on with electricity, then all branches are not in the blocking state. The damping coefficient of the adjustable solenoid valve PV on the corresponding branch may be adjusted to be the minimum by controlling the control voltage of the adjustable solenoid valve PV on the remaining branches. In this case, the oil may flow through all branches including the emergency oil line B3 and generate a damping force. In this case, the damping force generated by the damper is very small, and the damper is regarded as being a small damping mode, which is suitable for use in small damping conditions such as entry and exit easement curves. Easement curve refers to a curve whose curvature is continuously changed between a straight line and a circular curve or between circular curves in a plane linear shape. Easement curve is one of the linear elements of the road plane and is a curve whose curvature is continuously changed and provided between a straight line and a circular curve or between two circular curves having the same turning and a large difference in radius. When the vehicle follows the easement curve, the working conditions when entering the easement curve and exiting the easement curve are small damping conditions.

In the present embodiment, in order to prevent the oil pressure of the damper from being too high, and to improve the safety of the damper when adjusting parameters such as unloading force, unloading speed, and damping coefficient, it is preferable that the first node N1 and the second node N2 each is connected to the two cylinder blocks of the hydraulic cylinder 1 through a main oil line, at least one relief branch is connected between the two main oil lines, and all the relief branches are connected to each other in parallel. A relief valve is connected in series on the relief branch.

In the present embodiment, two relief branches PRB1, PRB2 are connected in parallel between the two main oil lines, and each of the two relief branches PRB1, PRB2 is connected with a relief valve PRV1 and a relief valve PRV2 in series. The relief valve PRV1 and the relief valve PRV2 separately and cooperatively limit a maximum damping force of the damper, and may cooperate with the adjustable solenoid valve PV in each branch to safely and accurately adjust the unloading force, unloading speed and damping coefficient of the damper.

The damper according to the present embodiment further includes an oil reservoir communicated with the two main oil lines through oil reservoir lines ROL1, ROL2, respectively. Throttle valves, namely the third throttle valve CV3 and the fourth throttle valve CV4 are respectively connected in series on the two oil reservoir lines ROL1, ROL2. A relief oil line communicates between the main oil lines and the oil reservoir, the relief oil line PROL1 is connected in parallel with each of the oil reservoir lines, and a relief valve PRV3 is installed in series on the relief oil line PROL1. The relief valve PRV3 may limit the maximum pressure inside the oil reservoir. The relief valve PRV3 is preset with a maximum safety pressure value PO. Once the pressure inside the oil reservoir is greater than the safety pressure value PO, the relief valve PRV3 is opened immediately, and the oil in the main oil line of the damper flows directly back into the oil reservoir. A reservoir port RP10 is provided on the oil reservoir to increase or decrease the amount of oil inside the oil reservoir and control an oil level and oil pressure as required.

As shown in FIG. 1, a damping system according to an embodiment of the present application includes a controller 3 and at least one semi-active anti-yaw damper 100 as described above installed on a bogie. The signal input end and the signal output end of the controller 3 are connected to each damper, respectively. The required performance parameters of the damper are calculated according to the actual operation state of the vehicle using the controller 3, the controller 3 then transmits control signals with the current performance parameters to the damper, so as to ensure that the damper may adjust various performance parameters in real time according to the operation requirements of the vehicle.

In order to ensure that the controller 3 has a reliable data source during calculation, and a good and stable signal control circuit is formed between the controller 3 and the damper. Preferably, the system also includes a data acquisition mechanism. The data acquisition mechanism is installed on the damper and connected to the signal input end of the controller 3. The data acquisition mechanism is configured to transmit the real-time working parameters of the damper to the controller 3, so that the controller 3 may calculate damping forces required by the damper based on the real-time working parameters and feed control signals containing the damping forces back to the damper.

In the present embodiment, at least two data interfaces are provided on the controller 3. The controller 3 in the present embodiment mainly includes a first interface C1, a second interface C2, and a third interface C3. The first interface C1 is a signal output end, the second interface C2 is a signal input end, and the third interface C3 is a power supply and external device access end. The first interface C1 is connected to the adjustable solenoid valves PV of each branch on the damper, and is configured to adjust control voltages of the adjustable solenoid valves PV and other parameters in real time according to the calculation result of the controller 3 so as to adjust the performance parameters of the damper.

The data acquisition mechanism of the present embodiment includes pressure sensors P11, P12 and displacement sensor PP1. The two cylinder blocks of the hydraulic cylinder 1 are respectively provided with pressure sensors PP1. The pressure sensors and the displacement sensor are respectively connected to the second interface C2 as a signal input end on the controller 3. The pressure sensors P11 and P12 are installed on the first cylinder PA and the second cylinder PB, respectively to sense the oil pressure values inside the two cylinder blocks on both sides of the piston 2 inside the hydraulic cylinder 1 in real time. The displacement sensor PP1 is installed on the piston 2 or a piston rod, so as to sense the displacement of the piston 2 or the piston rod inside the damper with respect to the entire hydraulic cylinder 1 in real time.

The data acquisition mechanism of the present embodiment includes an acceleration sensor. The acceleration sensor is connected to the second interface C2 as a signal input end on the controller 3. The acceleration sensor is installed on the vehicle and is configured to provide the controller 3 with acceleration data during the vehicle is running, so as to be used as reference data when the controller 3 calculates the required parameters of the damper.

The controller 3 of the present embodiment is also provided with an external interface, and the external interface is connected to a vehicle general control system. A cut-off relay 4 is installed between the controller 3 and the vehicle general control system. The cut-off relay 4 is linked with the on-board instability monitoring system. Once the bogie instability monitoring system gives an alarm, the cut-off relay 4 may work and cut off the power supply of the semi-active anti-yaw damper such that the whole damper system is powered off, and the damper is forcibly switched to the passive mode. In this case, the damper has the same performance as the traditional passive damper, which is sufficient to ensure that the vehicle continues to operate normally.

In summary, when the piston 2 of the semi-active anti-yaw damper 100 according to the present application reciprocates inside the hydraulic cylinder 1, an interior of the hydraulic cylinder 1 can be divided into two cylinder blocks. The damper includes at least two parallel branches, the two ends of each of the parallel branches are connected to the two cylinder blocks, respectively, and each of the parallel branches is provided with an adjustable solenoid valve PV, and the adjustable solenoid valve PV is configured to adjust a damping coefficient of the damper when the damper is in a semi-active mode. The semi-active anti-yaw damper 100 is in the semi-active mode during normal operation, and in this case, the damper changes the branch through which the oil flows based on the oil pressure difference between the two cylinder blocks in the hydraulic cylinder 1, and adjust the damping force of oil by using the adjustable solenoid valve PV on the corresponding branch to such that the damper has a adjustable damping force and damping coefficient in the semi-active mode, thereby solving above-mentioned defects due to the inability to adjust the performance parameters of the traditional anti-yaw dampers in the prior art.

The damping system according to embodiments of the present application includes a controller 3 and at least one above-mentioned semi-active anti-yaw damper 100 installed on the bogie, and the signal input end and the signal output end of the controller 3 are connected to each damper, respectively. The required performance parameters of the damper are calculated according to the actual operation state of the vehicle using the controller 3, the controller 3 then transmits control signals with the current performance parameters to the damper, so as to ensure that the damper may adjust various performance parameters in real time according to the operation requirements of the vehicle so that a suspension system of the train keeps being in the best matching state, and may be compatible with different geographic environments, operation demands of vehicles required by different lines, and the repair cycle of vehicles may be effectively extended, the service life of the vehicle is prolonged and the operating costs are decreased.

The embodiments of the present application have been presented for purposes of illustration and description, and are not intended to be exhaustive or to limit the application to the form disclosed. Many modifications and variations are apparent to those skilled in the art. The embodiments are selected and described in order to best explain the principles and embodiments of the present application, and can be understood by those skilled in the art to design various embodiments with various modifications suitable for the particular application.

In the description of the present application, it is to be noted that unless explicitly stated and defined otherwise, the terms "installed/mounted", "connected with," and "connected to" shall be understood broadly, for example, it may be either fixedly connected or detachably connected, or can be integrated; it may be mechanically connected, or electrically connected; it may be directly connected, or indirectly connected through an intermediate medium. The specific meanings of the terms above in the present utility model can be understood by a person skilled in the art in accordance with specific conditions.

What is claimed is:

1. A semi-active anti-yaw damper, comprising:
a hydraulic cylinder; and
a piston configured to divide an interior of the hydraulic cylinder into two cylinder chambers when the piston reciprocates in the hydraulic cylinder and fluid is flowable among branches of the semi-active anti-yaw damper using oil pressure difference between the two cylinder chambers,
wherein the semi-active anti-yaw damper further comprises at least two parallel branches, each branch of the at least two parallel branches has two ends respectively connected to the two cylinder chambers through a first node and a second node and is provided with an adjustable solenoid valve, and the adjustable solenoid valve is configured to adjust a damping coefficient of the semi-active anti-yaw damper when the semi-active anti-yaw damper is in a semi-active mode;
the first node and the second node respectively communicate with the two cylinder chambers of the hydraulic cylinder through respective main oil lines, and one or more relief branches connected to each other in parallel communicate between two main oil lines.

2. A damping system, comprising a controller and at least one semi-active anti-yaw damper of claim 1, wherein the at least one semi-active anti-yaw damper is mounted on a bogie, and a signal input end and a signal output end of the controller are respectively connected with each of the at least one semi-active anti-yaw damper.

3. The damping system of claim 2, further comprising a data acquisition mechanism mounted on the semi-active anti-yaw damper and connected with the signal input end of the controller,
wherein the data acquisition mechanism is configured to transmit real-time running parameters of the semi-active anti-yaw damper to the controller such that a damping force required for the damper is calculated by the controller according to the real-time running parameters, and a control signal involving the damping force is fed back to the semi-active anti-yaw damper.

4. The damping system of claim 3, wherein the data acquisition mechanism comprises a pressure sensor and a displacement sensor,
each of the two cylinder chambers of the hydraulic cylinder is provided with the pressure sensor therein, respectively,
the displacement sensor is provided on the piston, and
the pressure sensor and the displacement sensor are connected to the signal input end of the controller, respectively.

5. The damping system of claim 3, wherein the data acquisition mechanism comprises an acceleration sensor connected to the signal input end of the controller.

6. The damping system of claim 2, wherein the controller is provided with an external interface connected with a cut-off relay.

7. A vehicle comprising the damping system of claim 2.

8. The semi-active anti-yaw damper of claim 1, wherein each branch of the at least two parallel branches comprises a one-way throttle valve and the adjustable solenoid valve connected in series.

9. The semi-active anti-yaw damper of claim 8, further comprising an emergency oil line having both ends communicated with the two cylinder chambers, respectively, the emergency oil line is provided with a non-adjustable solenoid switch valve, and the non-adjustable solenoid switch valve is configured to enable the emergency oil line when the damper is in a passive mode.

10. The semi-active anti-yaw damper of claim 9, wherein the emergency oil line comprises a limit orifice and the solenoid switch valve connected to each other in series.

11. The semi-active anti-yaw damper of claim 1, wherein each branch of the at least two parallel branches comprises a first branch and a second branch,
an end of the first branch and an end of the second branch are connected in parallel at a first node, and another end of the first branch and another end of the second branch are connected in parallel at a second node, and the first node and the second node are communicated with the two cylinder chambers of the hydraulic cylinder, respectively; and
the first branch has an opposite flow direction to the second branch.

12. The semi-active anti-yaw damper of claim 11, further comprising an emergency oil line having both ends communicated with the two cylinder chambers, respectively, the emergency oil line is provided with a non-adjustable solenoid switch valve, and the non-adjustable solenoid switch valve is configured to enable the emergency oil line when the damper is in a passive mode.

13. The semi-active anti-yaw damper of claim 12, wherein the emergency oil line comprises a limit orifice and the solenoid switch valve connected to each other in series.

14. The semi-active anti-yaw damper of claim 1, further comprising an oil reservoir communicated with the two main oil lines through oil reservoir lines, respectively, and each of the oil reservoir lines is connected in series with a throttle valve.

15. The semi-active anti-yaw damper of claim 14, wherein a relief oil line is communicated between the main oil line and the oil reservoir, the relief oil line is connected in parallel with each of the oil reservoir lines, and the relief oil line is connected in series with a relief valve.

16. The semi-active anti-yaw damper of claim 1, further comprising an emergency oil line having both ends communicated with the two cylinder chambers, respectively, the emergency oil line is provided with a non-adjustable solenoid switch valve, and the non-adjustable solenoid switch valve is configured to enable the emergency oil line when the damper is in a passive mode.

17. The semi-active anti-yaw damper of claim 16, wherein the emergency oil line comprises a limit orifice and the solenoid switch valve connected to each other in series.

18. The semi-active anti-yaw damper of claim 1, wherein each of the one or more relief branches is connected in series with a relief valve.

19. The semi-active anti-yaw damper of claim 1, wherein the emergency oil line comprises a limit orifice and the solenoid switch valve connected to each other in series.

* * * * *